Jan. 6, 1948.   B. F. HARTMAN   2,434,040
HYDROGEN FLUORIDE RECOVERY
Filed Dec. 18, 1945
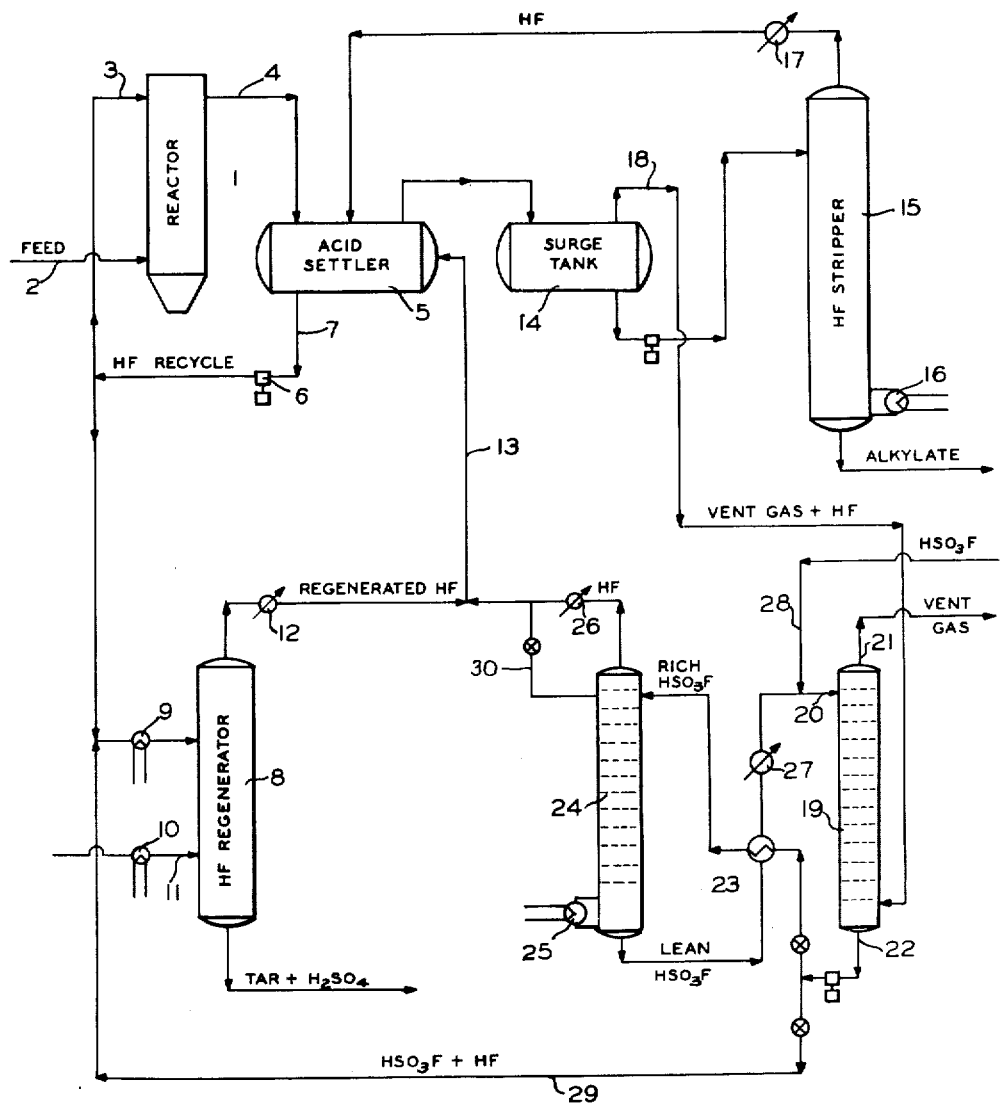
BENJAMIN F. HARTMAN
*INVENTOR.*
BY Oswald G. Hayes
ATTORNEY Patented Jan. 6, 1948

2,434,040

UNITED STATES PATENT OFFICE 2,434,040

HYDROGEN FLUORIDE RECOVERY

Benjamin F. Hartman, Augusta, Kans., assignor to Socony-Vacuum Oil Company, Incorporated, New York, N. Y., a corporation of New York Application December 18, 1945, Serial No. 635,759

3 Claims. (Cl. 260—683.4)

This invention relates to a process for the recovery of hydrogen fluoride from mixtures thereof with hydrocarbon gases. The process is particularly applicable for use in plants for catalytic alkylation of paraffin hydrocarbons in the presence of hydrogen fluoride as a catalyst and, in such modifications, preferred embodiments of the invention contemplate a step wherein liquid acid recirculated in the system is dehydrated and reconditioned as a catalyst.

Hydrogen fluoride has come into wide use recently as a catalyst for inducing the alkylation reaction between isoparaffins and olefins by intimately contacting liquid hydrogen fluoride with a mixture of isoparaffins and olefins wherein the former is present in substantially large excess in order to suppress polymerization of the olefin. The nature of the contact between catalyst and reactance is not of particular importance to the present invention. The process commonly used at the present time in commercial installations includes a "contactor" wherein the mutually immiscible liquid phases, namely catalyst and reactants, are agitated and circulated in a cyclic path to produce an intimate dispersion of the two phases. A stream of reactants, for example, three parts of isobutane to one part of butene, is continuously added in liquid phase to the circulating mass and a suitable proportion of catalyst is also added continuously. A stream of the dispersion is continuously withdrawn and passed to an enlarged settling zone wherein the acid separates from a hydrocarbon layer containing the alkylate and unreacted hydrocarbons.

It has also been proposed to conduct the reaction by passing a similar dispersion through a long path under conditions of agitation. Another proposal has been to introduce the reactants in vapor phase to the bottom of a relatively deep pool of the catalyst as described in application Serial No. 481,430, filed April 1, 1943, by Doherty and O'Kelly. See Patents 2,378,439, June 19, 1945, and 2,386,681, October 9, 1945. No matter what type of contact is employed, the hydrocarbons are generally separated from the catalyst by settling, either in the reaction zone or in the zone external thereto.

In normal commercial practice, there is a tendency for hydrocarbons of low boiling point to build up in the system. Thus, in the alkylation of isobutane with butene, propane and lighter hydrocarbons accumulate due to the fact that this compound is present in small amounts in the feed. Under certain conditions propane and lighter hydrocarbons may be formed in the reaction. No matter what it source, the propane is retained in the system by virtue of steps taken to recover and recycle the catalyst and/or unreacted hydrocarbon charge materials.

One method of removing these light hydrocarbons is by venting light gases from a chamber containing settled hydrocarbons. Such vent gases will contain hydrogen fluoride because that material is slightly soluble in the hydrocarbons and will tend to be evolved when the light gases are given off from the body of liquid hydrocarbons. By reason of the nature of the equilibria existing in a system of hydrogen fluoride and mixed hydrocarbons, the feasible methods of removing propane and the like will normally result in considerable amounts of hydrogen fluoride being given off at the same time.

According to the novel process described herein, hydrogen fluoride contained in such vent gases is recovered for reuse in the system by scrubbing the vent gases with fluosulfonic acid. This acid exhibits a high degree of solubility for hydrogen fluoride at normal temperatures and pressures and a comparatively low solubility at moderately elevated temperatures under atmospheric pressure. It is therefore a primary object of the present invention to recover hydrogen fluoride from gaseous hydrocarbon mixtures containing the same by scrubbing the mixed vapors with fluosulfonic acid and subsequently heating the rich absorbent to evolve hydrogen fluoride.

In connection with such a recovery step advantage may be also taken of the reaction between fluosulfonic acid and water to form hydrogen fluoride and sulfuric acid. Water entering the alkylation plant, for example, dissolved in the feed, tends to accumulate in the acid catalyst thus diminishing its catalytic activity. Previously known methods of eliminating water from the system to increase the concentration of the acid catalyst generally involved loss of hydrogen fluoride. Hydrogen fluoride forms a constant boiling mixture with acid which is highly corrosive and difficult to handle. These difficulties are eliminated according to the present invention by scrubbing the vent gases with fluosulfonic acid as described above and adding the enriched fluosulfonic acid to hydrogen fluoride recycled in the system. This additional step may be conveniently integrated in the system by introducing rich fluosulfonic acid absorbent into the conventional hydrogen fluoride regenerator wherein tar is separated from the acid catalyst, usually with the aid of a splitting medium.

These and other objects and advantages of the invention are readily apparent from consideration of the attached drawing showing, diagrammatically, modification of a commercial flow sheet to utilize the principle of this invention.

The alkylation reaction is conducted in a reactor 1 wherein a feed mixture, such as three parts of isobutane and one part of butene, supplied by feed line 2 is intimately contacted with hydrogen fluoride from line 3. A portion of the resultant mixture is continuously withdrawn through pipe 4 and passed to an acid settler 5 wherein stratification occurs to yield a lower liquid layer of hydrogen fluoride and an upper liquid layer of hydrogen fluoride and an upper liq- layer is withdrawn by pump 6 by way of pipe 7 to be recycled in part through line 3. Another portion of the acid is transferred to a regenerator 8 by way of heater 9. The regenerator 8 separates the catalyst from heavy hydrocarbons, "tar," contained therein and a stripping medium is preferably introduced to the regenerator through heater 10 and inlet 11. The regenerator may be a packed tower, a bubble column, or a flash drum. The tar is withdrawn as bottoms while regenerated hydrogen fluoride is passed overhead through condenser 12 and returned to the acid settler by line 13.

The hydrocarbon layer from the acid settler 5 is transferred to a surge tank 14 which supplies an HF stripper 15 adapted to remove dissolved hydrogen fluoride from the hydrocarbon mixture. Stripper 15 is equipped with a reboiler 16 and the stripped alkylate and recycle oils are taken off as bottoms while hydrogen fluoride, containing light hydrocarbons is returned to the acid settler by way of condenser 17. The light hydrocarbons, particularly propane and lighter, tend to build up in surge tank 14 and in order to avoid excessive pressures, these gases are vented from surge tank 14 through line 18 to waste. Under normal conditions these gases contain approximately 18% hydrogen fluoride by weight and result in considerable loss of this valuable chemical, for example, from 0.5 to 1 pound of hydrogen fluoride per barrel of alkylate produced.

In accordance with the principles of this invention the vent gases from line 18 are passed to a scrubber 19, entering the bottom thereof to pass countercurrent to a stream of fluosulfonic acid admitted at 20. Because of the selective solvent action of the fluosulfonic acid substantially all the hydrogen fluoride is absorbed from the hydrocarbon gases in scrubber 19 and substantially pure hydrocarbon gas is removed at 21 from the scrubber. The rich absorbent leaving the bottom of the scrubber at 22 can be handled in two different ways according to the needs of the process. The rich absorbent can be passed through heat exchanger 23 to the top of a stripping column 24 having reboiler 25 wherein hydrogen fluoride is stripped from the absorbent, liquefied in condenser 26 and returned to the acid settler through line 13. Lean fluosulfonic acid from the stripper is passed through heat exchanger 23 against the rich absorbent from scrubber 19, further cooled in heat exchanger 27 and returned to the top of scrubber 19. Fluosulfonic acid make-up may be added as needed by line 28.

A portion of the mixture of fluosulfonic acid and hydrogen fluoride is preferably conducted to the hydrogen fluoride regenerator 8 by way of pipe 29. In the regenerator 8, fluosulfonic acid reacts with the water present to form hydrogen fluoride and sulfuric acid. The sulfuric acid is of course removed with the tar from the bottom of the regenerator while the HF released upon decomposition of the fluosulfonic acid is added to the regenerated hydrogen fluoride for transfer to the acid settler. The fluosulfonic acid entering regenerator 8 from line 29 supplies HF in two ways. Absorbed HF is released in the regenerator and HF is formed by reaction of fluosulfonic acid with water to the extent that water is present in the regenerator.

The fluosulfonic acid scrubbing system may be operated at any desired pressure, for example up to 140 pounds per square inch gauge. However, the system works very satisfactorily at or near atmospheric pressures and such pressures are preferred. For practical reasons, the stripper is preferably operated at pressures sufficiently high to permit condensation of the overhead by use of plant water. If desired, a suitable amount of liquid from condenser 26 may be returned to stripper 24 as reflux by pipe 30. The ability to operate at increased pressures increases the flexibility of the operation in making it possible to readily increase the solubility of hydrogen fluoride in fluosulfonic acid. The following table shows the solubility of hydrogen fluoride in fluosulfonic acid at atmospheric pressure.

| Temp. | Wgt. per cent HF Dissolved in $HSO_3F$ |
|---|---|
| 80° F | 58.0 |
| 100° F | 33.0 |
| 120° F | 18.0 |
| 140° F | 11.0 |

In a typical operation the scrubber is operated at 80° F. and the stripper at 140° F.

It will be seen that the fluosulfonic acid could be passed to the regenerator 8 from any desired point in the scrubbing system. It would be uneconomical, in most instances, to pass lean absorbent to the regenerator since the cost of stripping is saved by transferring rich absorbent directly to the regenerator.

I claim:

1. In a process for the catalytic alkylation of isoparaffins with olefins by contacting a reactant mixture of isoparaffins and olefins with liquid hydrogen fluoride, settling the resultant mixture to produce a hydrocarbon phase and a hydrogen fluoride phase, venting light gases from the hydrocarbon phase and regenerating at least a portion of the hydrogen fluoride phase by removing dissolved hydrocarbons therefrom and returning the regenerated hydrogen fluoride to said contacting step, said process resulting in dilution of the hydrogen fluoride by water entering the system; the steps which comprise scrubbing the gases vented from said hydrocarbon phase with fluosulfonic acid at about 80° F. and about atmospheric pressure to remove hydrogen fluoride therefrom and produce a solution of hydrogen fluoride in fluosulfonic acid, stripping dissolved hydrogen fluoride from a portion of said solution, returning the hydrogen fluoride so recovered to the contacting step, and adding another portion of said solution to the hydrogen fluoride in said regeneration step to react with water contained in the hydrogen fluoride from said hydrogen fluoride phase.

2. In a process for the catalytic alkylation of isoparaffins with olefins by contacting a reactant mixture of isoparaffins and olefins with liquid hydrogen fluoride, settling the resultant mixture to produce a hydrocarbon phase and a hydrogen fluoride phase, venting light gases from the hydrocarbon phase, regenerating at least a portion of the hydrogen fluoride phase by removing dissolved hydrocarbons therefrom and returning the regenerated hydrogen fluoride to said contacting step, said process resulting in dilution of the hydrogen fluoride by water entering the system; the steps which comprise scrubbing the gases vented from said hydrocarbon phase with fluosulfonic acid at about 80° F. and about atmospheric pressure to remove hydrogen fluoride therefrom and produce a solution of hydrogen fluoride in fluosulfonic acid and adding at least a portion of said solution to the hydrogen fluoride in said regeneration step to react with water contained in the hydrogen fluoride from said hydrogen fluoride phase.

3. In a process for the catalytic alkylation of isoparaffins with olefins by contacting a reactant mixture of isoparaffins and olefins with liquid hydrogen fluoride, settling the resultant mixture to produce a hydrocarbon phase and a hydrogen fluoride phase, venting light gases from the hydrocarbon phase, regenerating at least a portion of the hydrogen fluoride phase by removing dissolved hydrocarbons therefrom and returning the regenerated hydrogen fluoride to said contacting step, said process resulting in dilution of the hydrogen fluoride by water entering the system; the steps which comprise scrubbing the gases vented from said hydrocarbon phase with fluosulfonic acid to remove hydrogen fluoride therefrom and produce a solution of hydrogen fluoride in fluosulfonic acid and adding at least a portion of said solution to the hydrogen fluoride in said regeneration step to react with water contained in the hydrogen fluoride from said hydrogen fluoride phase.

BENJAMIN F. HARTMAN.

REFERENCES CITED

The following references are of record in the file of this patent:

UNITED STATES PATENTS

| Number | Name | Date |
|---|---|---|
| 2,320,629 | Matuszak | June 1, 1943 |
| 2,388,135 | Frey | Oct. 30, 1945 |
| 2,388,156 | Kelley | Oct. 30, 1945 |

FOREIGN PATENTS

| Number | Country | Date |
|---|---|---|
| 16,518 | Great Britain | Sept. 15, 1910 |

OTHER REFERENCES

Mellor, Comp. Treatise on Inorg. and Theoretical Chem., vol. 19, 1930, Longmans, Green & Co., N. Y., page 684.

---

Certificate of Correction

Patent No. 2,434,040.  January 6, 1948.

BENJAMIN F. HARTMAN

It is hereby certified that errors appear in the printed specification of the above numbered patent requiring correction as follows: Column 2, line 2, for "it" read *its*; column 3, line 18, for "hydrogen fluoride and an upper liq-" read *hydrocarbons. Acid from the lower*; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*

2. In a process for the catalytic alkylation of isoparaffins with olefins by contacting a reactant mixture of isoparaffins and olefins with liquid hydrogen fluoride, settling the resultant mixture to produce a hydrocarbon phase and a hydrogen fluoride phase, venting light gases from the hydrocarbon phase, regenerating at least a portion of the hydrogen fluoride phase by removing dissolved hydrocarbons therefrom and returning the regenerated hydrogen fluoride to said contacting step, said process resulting in dilution of the hydrogen fluoride by water entering the system; the steps which comprise scrubbing the gases vented from said hydrocarbon phase with fluosulfonic acid at about 80° F. and about atmospheric pressure to remove hydrogen fluoride therefrom and produce a solution of hydrogen fluoride in fluosulfonic acid and adding at least a portion of said solution to the hydrogen fluoride in said regeneration step to react with water contained in the hydrogen fluoride from said hydrogen fluoride phase.

3. In a process for the catalytic alkylation of isoparaffins with olefins by contacting a reactant mixture of isoparaffins and olefins with liquid hydrogen fluoride, settling the resultant mixture to produce a hydrocarbon phase and a hydrogen fluoride phase, venting light gases from the hydrocarbon phase, regenerating at least a portion of the hydrogen fluoride phase by removing dissolved hydrocarbons therefrom and returning the regenerated hydrogen fluoride to said contacting step, said process resulting in dilution of the hydrogen fluoride by water entering the system; the steps which comprise scrubbing the gases vented from said hydrocarbon phase with fluosulfonic acid to remove hydrogen fluoride therefrom and produce a solution of hydrogen fluoride in fluosulfonic acid and adding at least a portion of said solution to the hydrogen fluoride in said regeneration step to react with water contained in the hydrogen fluoride from said hydrogen fluoride phase.

BENJAMIN F. HARTMAN.

REFERENCES CITED

The following references are of record in the file of this patent:

UNITED STATES PATENTS

| Number | Name | Date |
| --- | --- | --- |
| 2,320,629 | Matuszak | June 1, 1943 |
| 2,388,135 | Frey | Oct. 30, 1945 |
| 2,388,156 | Kelley | Oct. 30, 1945 |

FOREIGN PATENTS

| Number | Country | Date |
| --- | --- | --- |
| 16,518 | Great Britain | Sept. 15, 1910 |

OTHER REFERENCES

Mellor, Comp. Treatise on Inorg. and Theoretical Chem., vol. 19, 1930, Longmans, Green & Co., N. Y., page 684.

Certificate of Correction

Patent No. 2,434,040.        January 6, 1948.

BENJAMIN F. HARTMAN

It is hereby certified that errors appear in the printed specification of the above numbered patent requiring correction as follows: Column 2, line 2, for "it" read *its*; column 3, line 18, for "hydrogen fluoride and an upper liq-" read *hydrocarbons. Acid from the lower*; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*